United States Patent
Ranjan et al.

(10) Patent No.: US 12,505,287 B2
(45) Date of Patent: Dec. 23, 2025

(54) POWER OPTIMIZED ARCHITECTURE FOR LARGE LANGUAGE MODEL-BASED APPLICATIONS

(71) Applicant: QUALCOMM Incorporated, San Diego, CA (US)

(72) Inventors: Suyash Ranjan, San Diego, CA (US); Franck Dahan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 18/453,844

(22) Filed: Aug. 22, 2023

(65) Prior Publication Data

US 2025/0068838 A1 Feb. 27, 2025

(51) Int. Cl.
*G06F 40/20* (2020.01)
*G06F 15/78* (2006.01)

(52) U.S. Cl.
CPC .......... *G06F 40/20* (2020.01); *G06F 15/7825* (2013.01)

(58) Field of Classification Search
CPC ...... G06F 9/5027; G06F 16/245; G06F 17/16; G06F 40/20; G06F 15/7825; G06N 3/045; G06N 3/063; G06N 20/00; G10L 17/18; G06V 10/82; G06V 20/59
See application file for complete search history.

(56) References Cited

U.S. PATENT DOCUMENTS

| | | | | |
|---|---|---|---|---|
| 8,089,813 | B2 * | 1/2012 | Dreps | G11C 5/063 365/185.2 |
| 8,547,135 | B1 * | 10/2013 | Yarlagadda | H03K 19/177 326/38 |
| 11,659,401 | B1 * | 5/2023 | Montalvo | H04W 28/0967 455/452.1 |
| 2008/0059827 | A1 * | 3/2008 | Malekkhosravi | G06F 1/04 713/500 |
| 2009/0204831 | A1 * | 8/2009 | Cousson | G06F 1/324 713/322 |
| 2015/0046641 | A1 * | 2/2015 | Yoshihara | G11C 7/1072 711/105 |
| 2017/0102754 | A1 * | 4/2017 | Chi | G06F 1/10 |
| 2022/0026987 | A1 | 1/2022 | Hu et al. | |
| 2024/0062067 | A1 * | 2/2024 | Hu | G06V 10/82 |
| 2024/0095077 | A1 * | 3/2024 | Singh | G06F 9/5027 |
| 2025/0045107 | A1 * | 2/2025 | Albericio Latorre | G06F 17/16 |

(Continued)

OTHER PUBLICATIONS

Anonymous: "Test Happens—Teledyne LeCroy Blog: Fundamentals of the DDR Memory Interface", Mar. 29, 2017, 2 Pages, XP093216413, p. 1.

(Continued)

*Primary Examiner* — Jakieda R Jackson
(74) *Attorney, Agent, or Firm* — Seyfarth Shaw LLP

(57) ABSTRACT

A large language model (LLM)-based machine learning (ML) system-on-chip (SoC) is described. The LLM-based SoC includes a first LLM processing block. The LLM-based SoC also includes a first memory controller coupled to the first LLM processing block. The LLM-based SoC further includes a first physical layer (PHY) memory interface coupled to the first LLM processing block through the first memory controller. The LLM-based SoC further includes a memory coupled to the first PHY memory interface as a first data channel.

18 Claims, 8 Drawing Sheets

(56) References Cited

U.S. PATENT DOCUMENTS

2025/0045589 A1* 2/2025 Rengasamy ........... G06N 3/045
2025/0046316 A1* 2/2025 Rose ..................... H04M 3/568

OTHER PUBLICATIONS

International Search Report and Written Opinion—PCT/US2024/036597—ISA/EPO—Oct. 29, 2024.
Liu W-C., et al., "A Micro-Network on Chip with 10-Gb/s Transmission Link", 2009 IEEE Asian Solid-State Circuits Conference (A-SSCC), IEEE, Piscataway, NJ, USA, Nov. 16, 2009, pp. 277-280, XP031582982, p. 1.

* cited by examiner

POWER OPTIMIZED ARCHITECTURE FOR LARGE LANGUAGE MODEL-BASED APPLICATIONS

TECHNICAL FIELD

Certain aspects of the present disclosure relate to artificial neural networks and, more particularly, to a power optimized hardware architecture for large language model (LLM)-based applications.

BACKGROUND

An artificial neural network, which may include an interconnected group of artificial neurons, may be a computational device or may represent a method to be performed by a computational device. Artificial neural networks may have corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks may be useful in applications where the complexity of the task and/or data makes the design of the function burdensome using conventional techniques.

A large language model (LLM) is a type of artificial intelligence in which a deep learning model is trained to understand and generate text in a human-like manner. For example, a trained LLM learns a deep learning algorithm that can recognize, summarize, translate, predict, and generate content using exceptionally large datasets. As a result, LLM applications have become extremely popular recently. In the future, LLM applications are expected to experience tremendous growth and deployment across all spheres of computer applications. Industry experts and executives expect that technology companies will merge these LLM models into word processing applications with a preference for locally executed LLM models on consumer hardware to avoid the excessive cost of running the LLM models on their servers for all users all the time. As such, there is a profound interest and push to design hardware that enables support for running LLM model-based applications locally on consumer hardware.

SUMMARY

A large language model (LLM)-based machine learning (ML) system-on-chip (SoC) is described. The LLM-based SoC includes a first LLM processing block. The LLM-based SoC also includes a first memory controller coupled to the first LLM processing block. The LLM-based SoC further includes a first physical layer (PHY) memory interface coupled to the first LLM processing block through the first memory controller. The LLM-based SoC further includes a memory coupled to the first PHY memory interface as a first data channel.

A method for a large language model (LLM)-based machine learning (ML) system-on-chip (SoC) is described. The method includes forming a first LLM processing block. The method also includes coupling the LLM processing block to a first memory controller. The method further includes coupling the first LLM processing block to a first physical layer (PHY) memory interface through the first memory controller. The method further includes coupling a memory to the first PHY memory interface as a first data channel.

This summary has outlined, broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for conducting the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
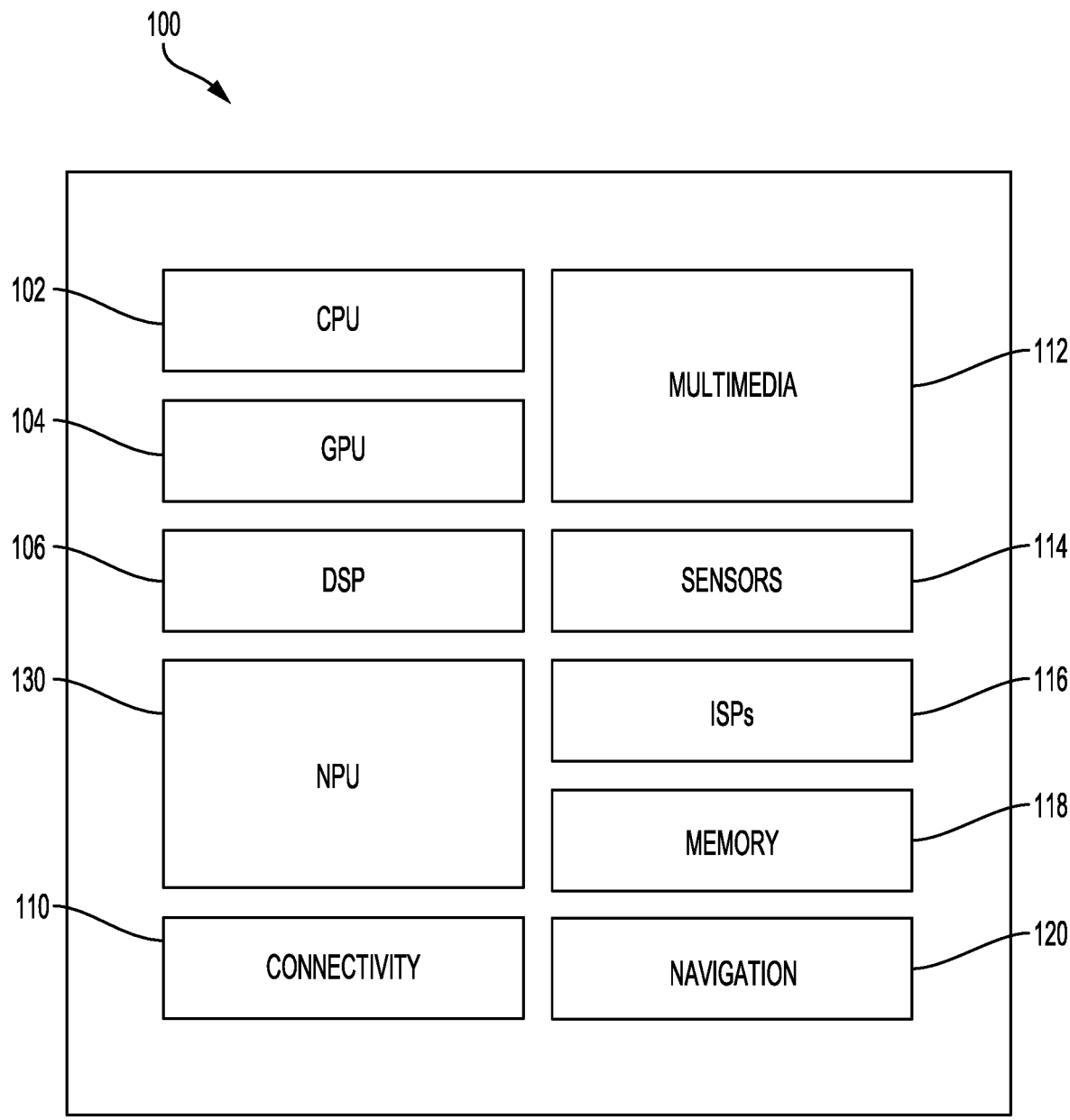
FIG. 1 illustrates an example implementation of a system-on-chip (SoC) architecture for running large language model (LLM)-based applications using neural processing unit (NPU) engines, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. Nevertheless, it will be apparent to those skilled in the art that these concepts may be practiced without these specific details. In some instances, well-known structures and components are shown in block diagram form to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. Any aspect of the disclosure disclosed may be embodied by one or more elements of a claim.

Although aspects are described, many variations and permutations of these aspects fall within the scope of the disclosure. Although some benefits and advantages of the preferred aspects are mentioned, the scope of the disclosure is not intended to be limited to benefits, uses, or objectives. Rather, aspects of the disclosure are intended to be universally applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

A large language model (LLM) is a type of artificial intelligence in which a deep learning model is trained to understand and generate text in a human-like manner. For example, a trained LLM learns a deep learning algorithm that can recognize, summarize, translate, predict, and generate content using exceptionally large datasets. As a result, LLM applications have become extremely popular recently. In the future, LLM applications are expected to experience tremendous growth and deployment across all spheres of computer applications. Industry experts and executives expect that technology companies will merge these LLM models into word processing applications with a preference for locally executed LLM models on consumer hardware to avoid the prohibitive cost of running the LLM models on their servers for all users all the time. As such, there is profound interest and push to design hardware that enables support for running LLM model-based applications locally on the consumer hardware.

In practice, neural processing unit (NPU) engine processing specifications for LLM-based applications are low. Nevertheless, NPU engine processing of these LLM-based applications involves fetching extremely high bandwidth data from double data rate (DDR) memory (e.g., about 60 gigabytes per second (GBps) or more). As a result, there are two major challenges for the hardware platform including the NPU engines for running and sustaining LLM-based applications. In all current architectures, machine learning (ML)/artificial intelligence (AI) cores (e.g., NPU engines) are located deep inside system-on-chips (SoCs). As such, support for running LLM-based applications involves running an entire path from the NPU engines to DDR dynamic random-access memory (DRAM) at an elevated frequency and an elevated voltage. The introduction of high-speed memory (e.g., 4.8 GHz DDR frequency) at a voltage corner is expected to provide the bandwidth specified for support by LLM-based applications.

While the introduction of the high-speed memory can support running the elevated frequency and the elevated voltage path between the NPU engines and the DRAM, power consumption and thermal dissipation are the primary bottlenecks for sustaining LLM-based applications. For example, using a premier tier industry process node, an LLM-based application use case would consume a significant amount of power (e.g., 7.5-8.0 watts). The thermal limit for sustainability in most phones is four to five watts. As a result, even assuming a best-in-class premier tier phone, the significant power consumption (e.g., 7.5-8.0 watts) would quickly lead to thermal throttling and, as such, a user may be unable to use LLM-based applications for more than a few seconds continuously without incurring a performance degradation.

Various aspects of the present disclosure are directed to an improved SoC architecture design for significantly improving LLM-based application power consumption, while not impacting power for other scenarios. In various aspects of the present disclosure, an LLM-based machine learning (ML) architecture implements resolute large language model (LLM) processing block hardware for LLM processing separate from an NPU engine. These aspects of the present disclosure recognize that NPU engine processing specifications for LLM-based applications are small. These aspects of the present disclosure modify an SoC architecture to implement compact LLM processing blocks abutted to memory controllers as part of a digital interface.

In various aspects of the present disclosure, a memory controller, including an abutted LLM processing block, is integrated with a double data rate (DDR), physical layer (PHY) memory interface (DDR PHY) to provide an analog interface for a DDR memory. The idea is to keep this thin LLM block, and memory controller physically co-located with the DDR PHY, and as close as possible to the DDR memory. In these aspects of the present disclosure, integration of the LLM processing block, the memory controller, and the DDR PHY, all in the DDR PHY voltage domain, reduces a data path, which can significantly improve power and provide a thermal solution for LLM-based applications. Additionally, the LLM processing blocks within each of the memory controllers include the capability to intercommunicate between instances across data channels. Although some aspects of the present disclosure describe an LLM processing block and a memory controller (MC) being on digital rail that may be directly connected to DDR PHY rail, this digital rail may not directly connect to DDR PHY rail and is sourced from another supply.

FIG. 1 illustrates an example implementation of a system-on-chip (SoC) architecture for running large language model (LLM)-based application, which may include a central processing unit (CPU) 102 or multi-core CPUs, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 130, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

As noted above, a large language model (LLM) is a type of artificial intelligence in which a deep learning model is trained to understand and generate text in a human-like manner. For example, a trained LLM learns a deep learning algorithm that can recognize, summarize, translate, predict, and generate content using exceptionally large datasets. As a result, LLM applications have become extremely popular recently, and there is a very deep interest and push to design hardware that enables support for running LLM model-based applications locally on the hardware of the SoC 100.

Unfortunately, NPU engine processing specifications for running LLM-based applications are low. There are two major challenges for enabling the NPU 130 including the NPU engines for running and sustaining LLM-based applications. In all current architectures, machine learning (ML)/ artificial intelligence (AI) cores (e.g., NPU engines) are located deep inside the SoC 100. As such, support for running LLM-based applications involves running an entire path from the NPU engines to the memory (e.g., DDR dynamic random-access memory (DRAM)) at an elevated frequency and an elevated voltage.

The SoC 100 may also include additional processing blocks tailored to specific functions, such as a connectivity block 110, which may include sixth generation (6G) connectivity, fifth generation (5G) new radio (NR) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114 to provide sensor image data, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are like what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in diverse ways to recognize cars, trucks, and airplanes.

Neural networks may be designed with a variety of connectivity patterns. In feed-forward networks, information is passed from lower to higher layers, with each neuron in each layer communicating to neurons in higher layers. A hierarchical representation may be built up in successive layers of a feed-forward network, as described above. Neural networks may also have recurrent or feedback (also called top-down) connections. In a recurrent connection, the output from a neuron in each layer may be communicated to another neuron in the same layer. A recurrent architecture may be helpful in recognizing patterns that span more than one of the input data chunks that are delivered to the neural network in a sequence. A connection from a neuron in each layer to a neuron in a lower layer is called a feedback (or top-down) connection. A network with many feedback connections may be helpful when the recognition of a high-level concept may aid in discriminating the low-level features of an input.

Figure 2A:
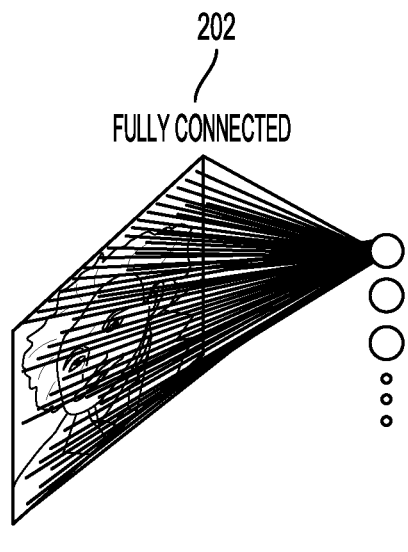
FIGS. 2A, 2B, and 2C are diagrams illustrating a neural network, in accordance with various aspects of the present disclosure.
Figure 2B:
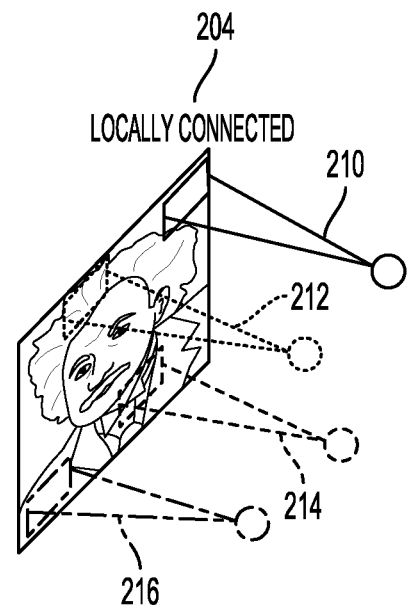

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer because the higher layer neurons in each region may receive inputs that are tuned through training to the properties of a restricted portion of the total input to the network.

Figure 2C:
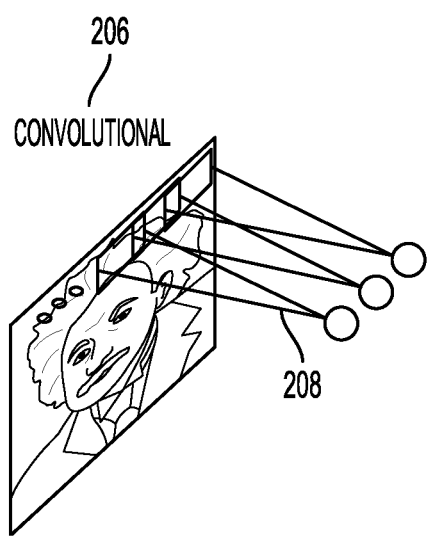

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
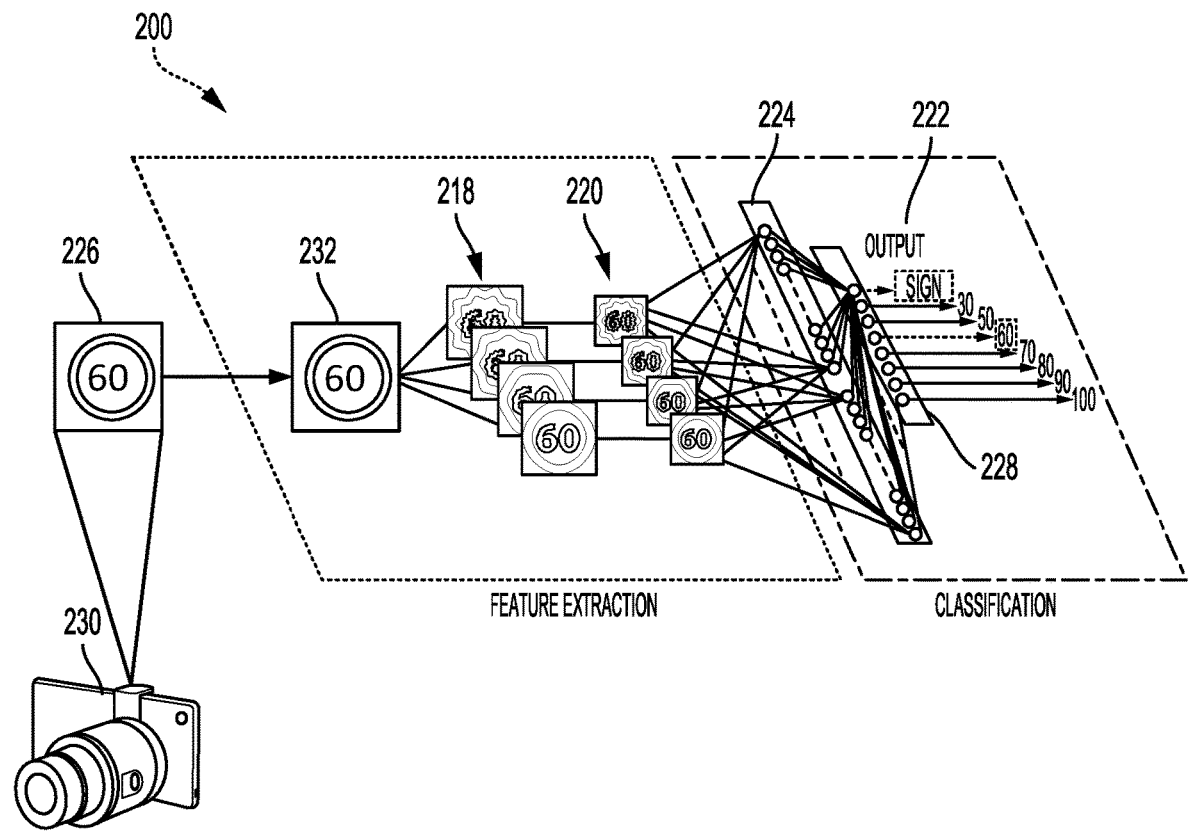
FIG. 2D is a diagram illustrating a neural network, in accordance with various aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different convolutional kernels were applied to the image 226 at the convolutional layer 232, four different feature maps are generated in the first set of feature maps 218. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a feature of the image 226, such as "sign," "60," and "100." A SoftMax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100." Before training, the output 222 produced by the DCN 200 may be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

Figure 3:
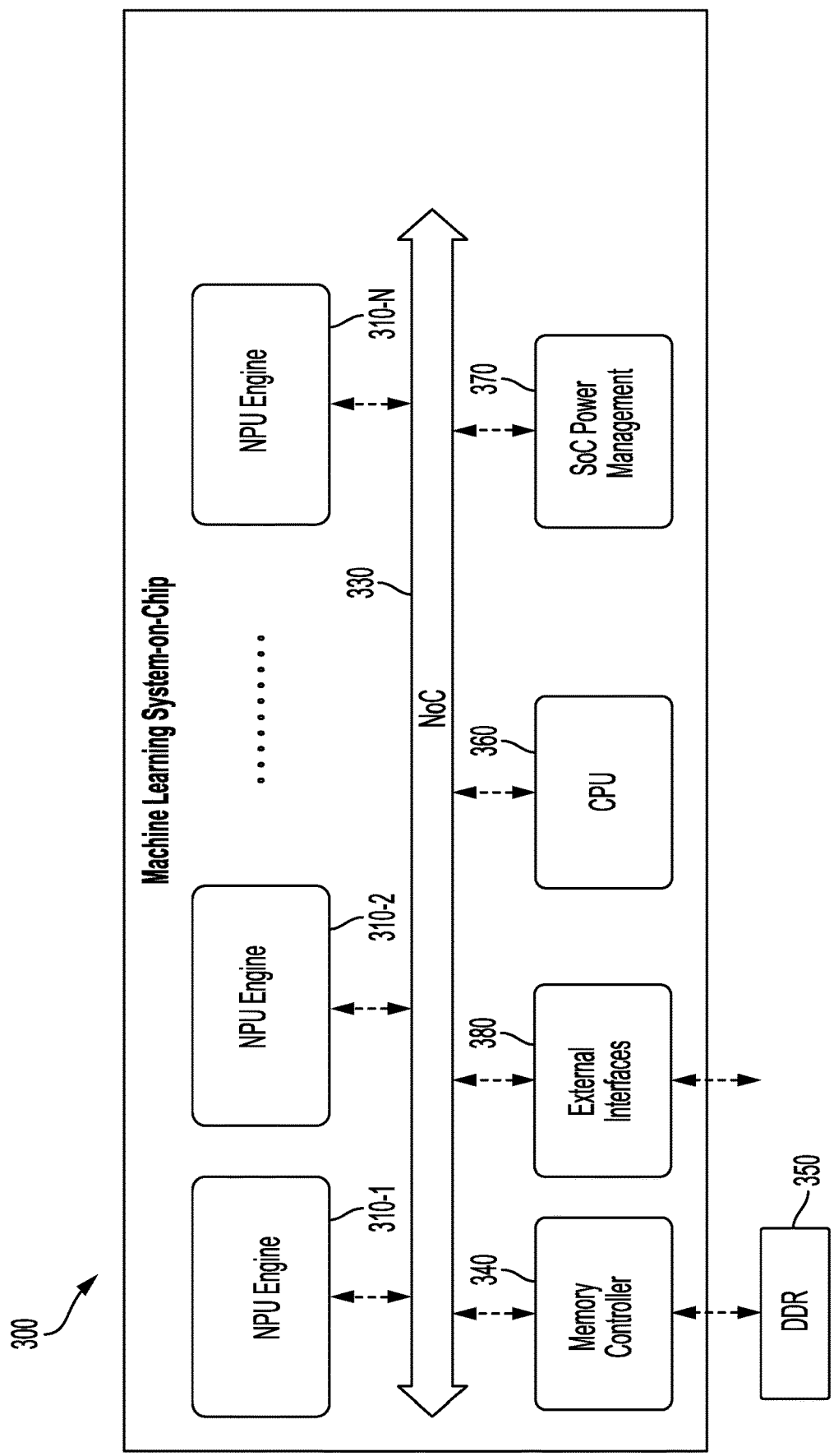
FIG. 3 is a block diagram illustrating a machine learning (ML) system-on-chip (SoC) architecture implementing neural processing unit (NPU) engines for running a large language model (LLM)-based application, in accordance with various aspects of the present disclosure.

FIG. 3 is a block diagram illustrating a machine learning (ML) system-on-chip (SoC) architecture for running a large language model (LLM)-based application, in accordance with various aspects of the present disclosure. As shown in FIG. 3, an ML-SoC 300 includes a set of neural processing unit (NPU) engines 310 (310-1, 310-2, . . . , 310-N) coupled together through a network-on-chip (NoC) 330. As shown in FIG. 3, the ML-SoC 300 includes a central processing unit (CPU) 360 and an SoC power management block 370 to control interoperation between the NPU engines 310. Additionally, the ML-SoC 300 includes external interfaces 380, as well as a memory controller 340 to access memory (e.g., double data rate (DDR) 350).

In some aspects of the present disclosure, the NPU engines 310 run an LLM-based application. In practice, processing specifications of the NPU engines 310 for processing LLM processing blocks of LLM-based applications are low. Nevertheless, the processing of the LLM-based application by the NPU engines 310 involves fetching extremely high bandwidth data from DDR memory 350. As a result, there are major challenges on the hardware platform of the ML-SoC 300 including the NPU engines 310 for running and sustaining LLM-based applications. Various aspects of the present disclosure are directed to an improved SoC architecture design for significantly improving LLM-based applications using a machine learning (ML) SoC architecture, for example, as shown in FIG. 4.

Figure 4A:
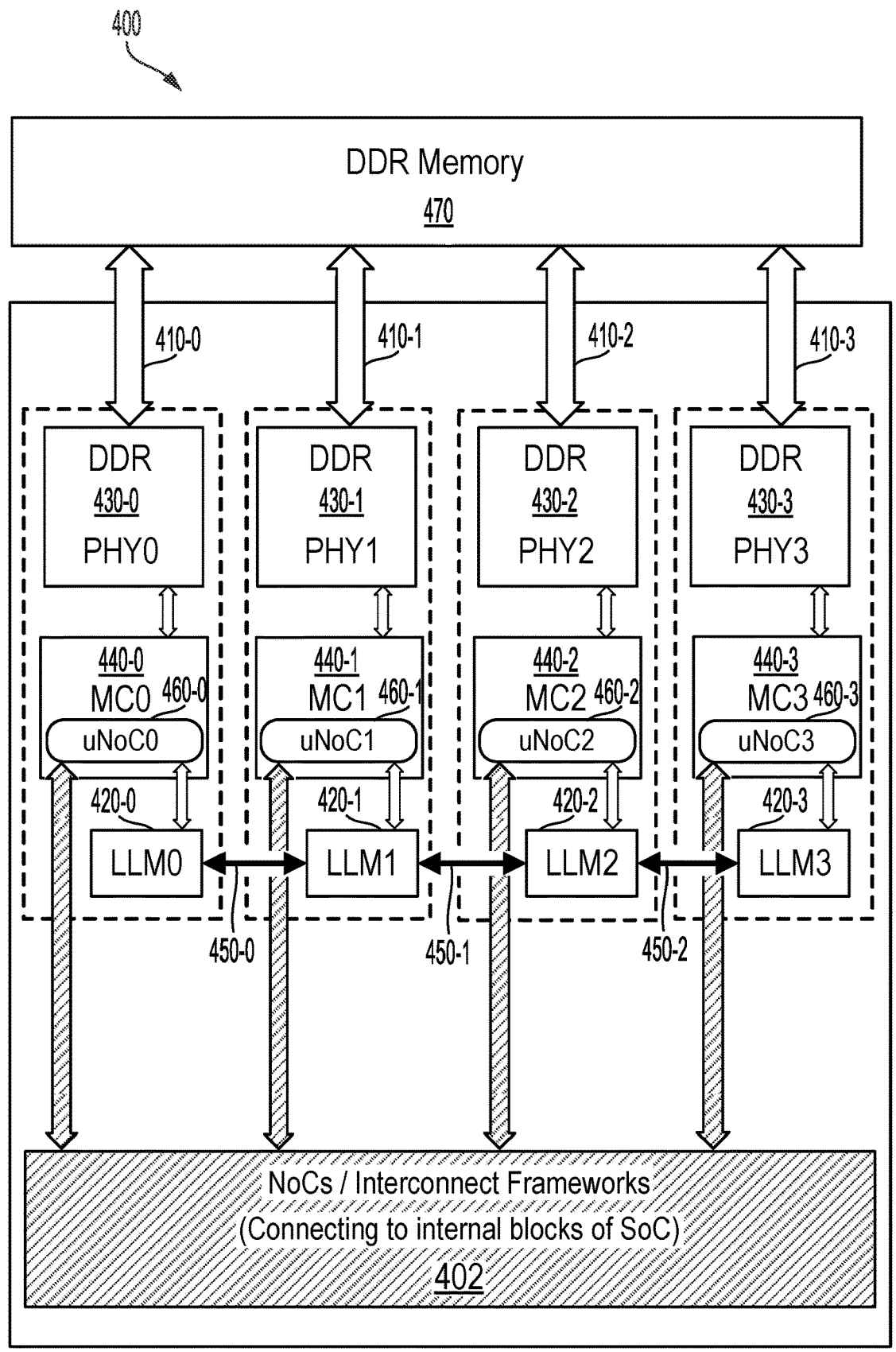
FIGS. 4A, 4b, and 4C are block diagrams illustrating a large language model (LLM)-based machine learning (ML) system-on-chip (SoC) architecture, according to various aspects of the present disclosure.
Figure 4B:
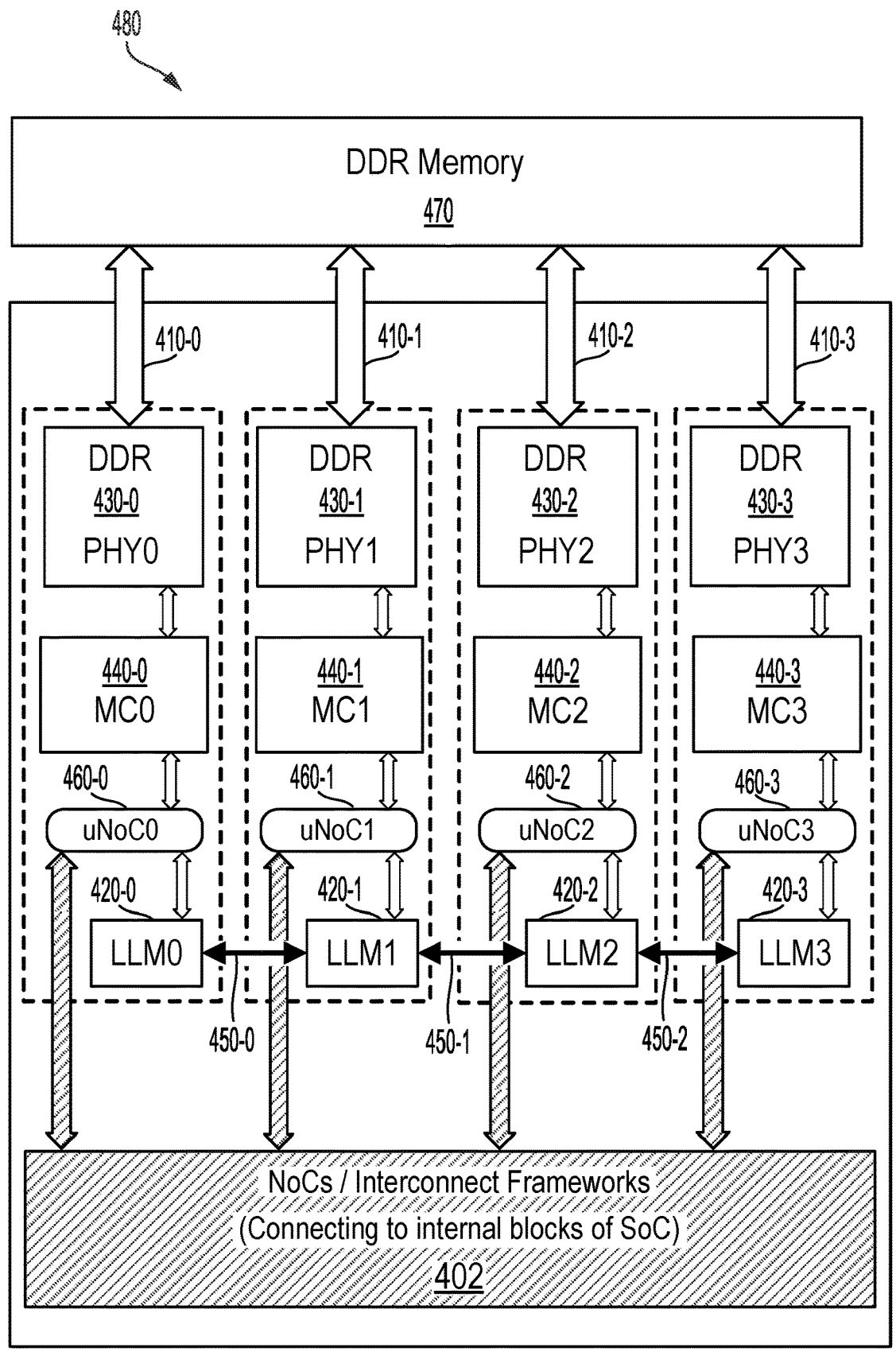
Figure 4C:
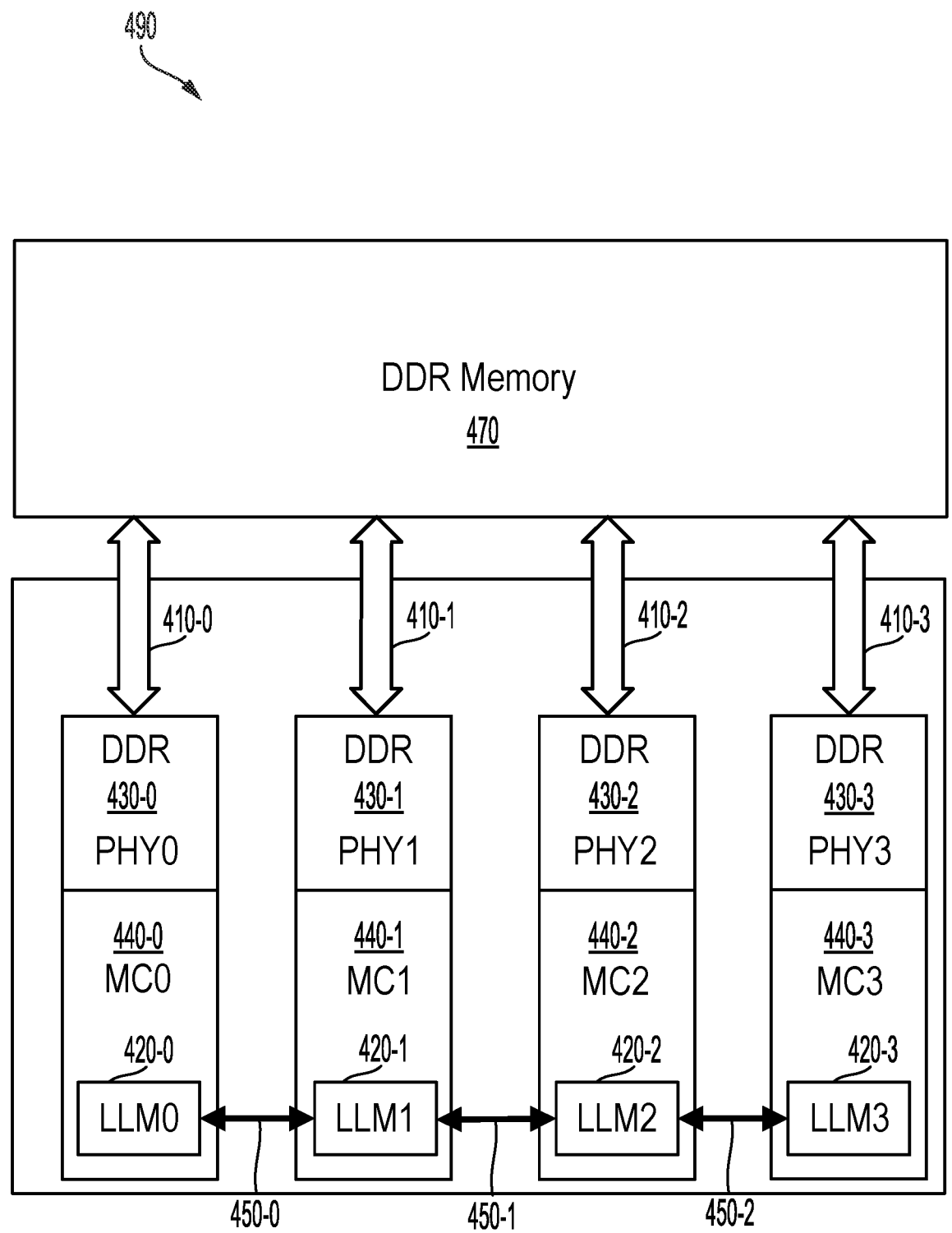

FIGS. 4A to 4C are block diagrams illustrating a large language model (LLM)-based machine learning (ML) system-on-chip (SoC), according to various aspects of the present disclosure. As shown in FIG. 4A, the LLM-based ML-SoC 400 includes four data channel interfaces 410 (410-0, 410-1, 410-2, 410-3) to a double data rate (DDR) memory 470 that are shown for enabling memory access from the LLM-based ML-SoC 400. As shown in FIG. 4A, the LLM processing blocks 420 (420-0, 420-1, 420-2, 420-3) and the memory controllers 440 (440-0, 440-1, 440-2, 440-3) are physically co-located with PHY DDR interfaces 430 (430-0, 430-1, 430-2, 430-3) for increasing a proximity to the DDR memory 470.

In various aspects of the present disclosure, the memory controllers 440 include an integrated, micro-network-on-chip (uNOC) 460 (460-0, 460-1, 460-2, 460-3) which are coupled to network-on-chip (NoC)/interconnect frameworks 402 as well as the LLM processing blocks 420. In various aspects of the present disclosure, the uNOC 460 are configured to route/arbitrate the traffic to/from the memory controllers 440 between LLM processing blocks 420 and rest of the SoC clients from the NoC/interconnect frameworks 402. Additionally, the LLM processing blocks 420 include intercommunication channels 450 (450-0, 450-1, 450-2, 450-3) between instances of the LLM processing blocks 420 across a data channel of the data channel interfaces 410 (e.g., an intercommunication channel between a first data channel and a second data channel).

FIG. 4B illustrates an LLM-based ML-SoC 480 according to various aspects of the present disclosure. The LLM-based ML-SoC 480 is like the LLM-based ML-SoC 400 of FIG. 4A and is described using similar reference numbers. In various aspects of the present disclosure, the LLM-based ML-SoC 480 includes the micro-network-on-chip (uNOC) 460 (460-0, 460-1, 460-2, 460-3) which are coupled to network-on-chip (NoC)/interconnect frameworks 402 as well as the LLM processing blocks 420. In various aspects of the present disclosure, the uNOC 460 are provided as a separate component from the memory controllers 440 and configured to route/arbitrate the traffic to/from the memory controllers 440 between LLM processing blocks 420 and rest of the SoC clients from the NoC/interconnect frameworks 402. Additionally, the LLM processing blocks 420 also include intercommunication channels 450 (450-0, 450-1, 450-2, 450-3) between instances of the LLM processing blocks 420 across a data channel of the data channel interfaces 410 (e.g., an intercommunication channel between a first data channel and a second data channel).

FIG. 4C illustrates an LLM-based ML-SoC 490 according to various aspects of the present disclosure. The LLM-based ML-SoC 490 is like the LLM-based ML-SoC 400 of FIG. 4A and is described using similar reference numbers. In various aspects of the present disclosure, the LLM-based ML-SoC 490 includes memory controllers (MCs) 440 having LLM processing blocks 420 integrated with physical layer (PHY) memory, DDR interfaces (PHY DDR) 430. In various aspects of the present disclosure, integration of the LLM processing blocks 420, the MCs 440 and the PHY DDR interfaces 430 (e.g., a first physical layer (PHY) memory interface and/or a second PHY memory interface) are in the PHY DDR voltage domain to provide the PHY DDR-MC-LLM combination block. This integration significantly reduces a data path between the LLM processing blocks 420 and the DDR memory 470, which can significantly improve power and provide a thermal solution for supporting LLM-based applications in SoC architectures. Additionally, the LLM processing blocks 420 in each of the MCs 440 (e.g., a first memory controller and/or a second memory controller) include the intercommunication channels 450 between instances of the LLM processing blocks 420 across a data channel of the data channel interfaces 410

(e.g., an intercommunication channel between a first data channel and a second data channel).

As shown in FIG. 4C, the LLM processing blocks 420 are implemented using a thin LLM core addition in the MCs 440 and the PHY DDR interfaces 430 to form the PHY DDR-MC-LLM block as the LLM-based ML-SoC 490. As a result, LLM related processing is performed inside the PHY DDR-MC-LLM block of the LLM-based ML-SoC 490. That is, the data is limited to flow between the DDR memory 470, the PHY DDR interfaces 430, the MCs 440, and the LLM processing blocks 420 (e.g., a first LLM processing block and/or a second LLM processing block). As a result, data flow through other portions of the SoC (e.g., the ML-SoC 300 of FIG. 3) is avoided for LLM-based applications.

Additionally, this configuration supports significantly increased data bandwidth (e.g., >60 GBps) that is currently traveling through the whole path between the NPU engines 310 to the DDR memory 350, as shown in FIG. 3. In particular, the LLM-based ML-SoC 400 achieves significant power savings (e.g., approximately 1.5 watts of power savings (approx. 20%)) for LLM-based application use cases, which enables compliance within thermal limits. An LLM-based application processing flow diagram is illustrated, for example, in FIG. 5.

Figure 5:
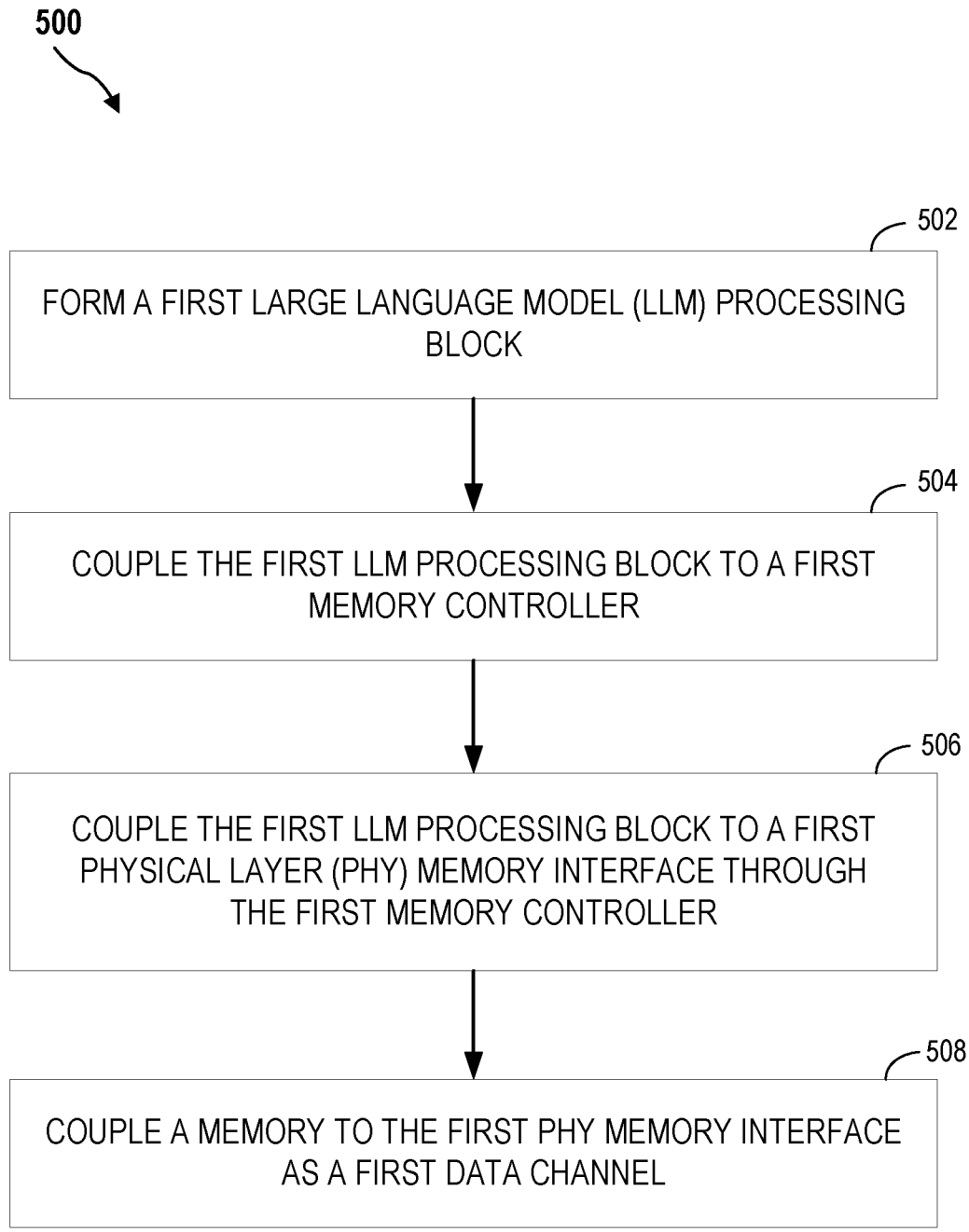
FIG. 5 is a flow diagram illustrating a method for large language model (LLM)-based application processing on a machine learning (ML) system-on-chip (SoC), according to various aspects of the present disclosure.

FIG. 5 is a flow diagram illustrating a method for large language model (LLM)-based application processing on a machine learning (ML) system-on-chip (SoC), according to various aspects of the present disclosure. A method 500 begins at block 502, in which a first LLM processing block is formed. At block 504, first LLM processing block is coupled a first memory controller. For example, as shown in FIG. 4, the first LLM processing block 420-0 is coupled to the first memory controller 440-0.

At block 504, the first LLM processing block is coupled to a first physical layer (PHY) memory interface through the first memory controller. For example, as shown in FIG. 4A, the first memory controller 440-0, the first LLM processing block 420-0, and the PHY DDR interface 430 are co-located together for increasing a proximity to a data channel interface to the DDR memory 470. As shown in FIG. 4A, the first LLM processing block 420-0, and the first memory controller 440 are physically co-located with the first PHY DDR interface 430-0 for increasing a proximity to the DDR memory 470.

At block 506, a memory is coupled to the first PHY memory interface as a first data channel. For example, as shown in FIG. 4, the LLM-based ML-SoC 400 includes the DDR memory 470 that is shown with the four data channel interfaces 410 for enabling access from the LLM-based ML-SoC 400. Integration of the LLM processing blocks 420, the MCs 440 and the PHY DDR interfaces 430 (e.g., a first physical layer (PHY) memory interface and/or a second PHY memory interface) are in the PHY DDR voltage domain to provide the PHY DDR-MC-LLM combination block. This integration significantly reduces a data path between the LLM processing blocks 420 and the DDR memory 470, which can significantly improve power and provide a thermal solution for supporting LLM-based applications in SoC architectures.

In some aspects, the method 500 may be performed by the SoC 100 (FIG. 1). That is, each of the elements of the method 500 may, for example, but without limitation, be performed by the SoC 100 or one or more processors (e.g., CPU 102 and/or NPU 130) and/or other components included therein.

Implementation examples are described in the following numbered clauses:

1. A large language model (LLM)-based machine learning (ML) system-on-chip (SoC), comprising:
   a first LLM processing block;
   a first memory controller coupled to the first LLM processing block;
   a first physical layer (PHY) memory interface coupled to the first LLM processing block through the first memory controller; and
   a memory coupled to the first PHY memory interface as a first data channel.
2. The LLM-based ML-SoC of clause 1, in which the first PHY memory interface comprises a double data rate (DDR), PHY voltage domain.
3. The LLM-based ML-SoC of any of clauses 1 or 2, in which the memory comprises a double data rate (DDR), dynamic random-access memory (DRAM).
4. The LLM-based ML-SoC of any of clauses 1-3, further comprising data channels, each coupled to an instance of the first PHY memory interface incorporating the first memory controller, including the first LLM processing block.
5. The LLM-based ML-SoC of clause 4, in which the first LLM processing block in a data channel is configured to intercommunicate with the first LLM processing blocks across the data channels.
6. The LLM-based ML-SoC of any of clauses 1-5, further comprising:
   a second memory controller having a second LLM processing block;
   a second PHY memory interface incorporating the second memory controller, including the second LLM processing block; and
   the memory coupled to the second PHY memory interface as a second data channel.
7. The LLM-based ML-SoC of clause 6, further comprising an intercommunication channel between the first LLM processing block and the second LLM processing block.
8. The LLM-based ML-SoC of any of clauses 1-7, in which the first PHY memory interface comprises an analog interface to the memory.
9. The LLM-based ML-SoC of any of clauses 1-8, in which in which the first memory controller, including the first LLM processing block comprises a digital interface to the first PHY memory interface.
10. The LLM-based ML-SoC of any of clauses 1-9, in which a voltage domain of the first memory controller and/or the first LLM processing block is different from a voltage domain of the first PHY memory interface.
11. The LLM-based ML-SoC of any of clauses 1-10, further comprising a micro-network-on-chip (uNOC) coupled to the first LLM processing block, the first memory controller, and a network-on-chip (NoC)/interconnect framework.
12. A method for a large language model (LLM)-based machine learning (ML) system-on-chip (SoC), the method comprising:
    forming a first LLM processing block;
    coupling the first LLM processing block to a first memory controller;
    coupling the first LLM processing block to a first physical layer (PHY) memory interface through the first memory controller; and
    coupling a memory to the first PHY memory interface as a first data channel.

13. The method of clause 12, in which the first PHY memory interface comprises a double data rate (DDR), PHY voltage domain.
14. The method of any of clauses 12 or 13, in which the memory comprises a double data rate (DDR), dynamic random-access memory (DRAM).
15. The method of any of clauses 12-14, further comprising data channels, each coupled to an instance of the first PHY memory interface incorporating the first memory controller, including the first LLM processing block.
16. The method of clause 15, further comprising intercommunicating between the first LLM processing block in a data channel with the first LLM processing blocks across the data channels.
17. The method of any of clauses 12-16, further comprising:
integrating a second LLM processing block in a second memory controller;
incorporating the second memory controller, including the second LLM processing block, in a second PHY memory interface; and
coupling the second PHY memory interface to the memory coupled as a second data channel.
18. The method of clause 17, further comprising forming an intercommunication channel between the first LLM processing block and the second LLM processing block.
19. The method of any of clauses 12-18, in which the first PHY memory interface comprises an analog interface to the memory.
20. The method of any of clauses 12-18, in which in which the first memory controller, including the first LLM processing block comprises a digital interface to the first PHY memory interface.
21. The method of any of clauses 12-20, in which a voltage domain of the first memory controller and/or the first LLM processing block is different from a voltage domain of the first PHY memory interface.
22. The method of any of clauses 12-21, further comprising a micro-network-on-chip (uNOC) coupled to the first LLM processing block, the first memory controller, and a network-on-chip (NoC)/interconnect framework.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database, or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed, include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such with cache and/or general register files. Although the various components discussed may be described as having a specific location, such as a local component, they may also be configured in numerous ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the application and the overall design constraints imposed on the overall system.

The machine-readable media may comprise several software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein, may be downloaded and/or otherwise obtained by a user terminal and/or base station as applicable. For example, such a device can be coupled to a server to facilitate the transfer of means for performing the methods described herein. Alternatively, various methods described herein, may be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A large language model (LLM)-based machine learning (ML) system-on-chip (SoC), comprising:
    a first LLM processing block;
    a first memory controller coupled to the first LLM processing block;
    a first physical layer (PHY) memory interface coupled to the first LLM processing block through the first memory controller; and
    a memory coupled to the first PHY memory interface as a first data channel, wherein the first PHY memory interface comprising an analog interface to the memory and the first memory controller, and the first LLM processing block comprising a digital interface to the first PHY memory interface.

2. The LLM-based ML-SOC of claim 1, wherein the first PHY memory interface comprises a double data rate (DDR), PHY voltage domain.

3. The LLM-based ML-SOC of claim 1, wherein the memory comprises a double data rate (DDR), dynamic random-access memory (DRAM).

4. The LLM-based ML-SOC of claim 1, further comprising data channels, each coupled to an instance of the first PHY memory interface incorporating the first memory controller, including the first LLM processing block.

5. The LLM-based ML-SoC of claim 4, wherein the first LLM processing block in a data channel is configured to intercommunicate with the first LLM processing blocks across the data channels.

6. The LLM-based ML-SOC of claim 1, further comprising:
    a second memory controller having a second LLM processing block;
    a second PHY memory interface incorporating the second memory controller, including the second LLM processing block; and
    the memory coupled to the second PHY memory interface as a second data channel.

7. The LLM-based ML-SOC of claim 6, further comprising an intercommunication channel between the first LLM processing block and the second LLM processing block.

8. The LLM-based ML-SOC of claim 1, wherein a voltage domain of the first memory controller and/or the first LLM processing block is different from a voltage domain of the first PHY memory interface.

9. The LLM-based ML-SOC of claim 1, further comprising a micro-network-on-chip (uNOC) coupled to the first LLM processing block, the first memory controller, and a network-on-chip (NoC)/interconnect framework.

10. A method for a large language model (LLM)-based machine learning (ML) system-on-chip (SoC), the method comprising:
    forming a first LLM processing block;
    coupling the first LLM processing block to a first memory controller;
    coupling the first LLM processing block to a first physical layer (PHY) memory interface through the first memory controller;
    coupling a memory to the first PHY memory interface as a first data channel, wherein the first PHY memory interface comprising an analog interface to the memory and the first memory controller, and the first LLM processing block comprising a digital interface to the first PHY memory interface; and
    routing, by a micro-network-on-chip (uNOC), data traffic to/from the first memory controller in response to arbitration between the first LLM processing block and SoC clients coupled to an interconnect framework.

11. The method of claim 10, wherein the first PHY memory interface comprises a double data rate (DDR), PHY voltage domain.

12. The method of claim 10, wherein the memory comprises a double data rate (DDR), dynamic random-access memory (DRAM).

13. The method of claim 10, further comprising data channels, each coupled to an instance of the first PHY memory interface incorporating the first memory controller, including the first LLM processing block.

14. The method of claim 13, further comprising intercommunicating between the first LLM processing block in a data channel with the first LLM processing blocks across the data channels.

15. The method of claim 10, further comprising:
    integrating a second LLM processing block in a second memory controller;
    incorporating the second memory controller, including the second LLM processing block, in a second PHY memory interface; and
    coupling the second PHY memory interface to the memory coupled as a second data channel.

16. The method of claim 10, wherein the first memory controller, including the first LLM processing block comprises a digital interface to the first PHY memory interface.

17. The method of claim 10, wherein a voltage domain of the first memory controller and/or the first LLM processing block is different from a voltage domain of the first PHY memory interface.

18. The method of claim 10, further comprising a micro-network-on-chip (uNOC) coupled to the first LLM processing block, the first memory controller, and a network-on-chip (NoC)/interconnect framework.

* * * * *